Patented Apr. 18, 1933

1,904,445

UNITED STATES PATENT OFFICE

DANIEL M. GRAY, OF WHEELING, WEST VIRGINIA, ASSIGNOR TO HAZEL-ATLAS GLASS CO., OF WHEELING, WEST VIRGINIA, A CORPORATION OF WEST VIRGINIA

PLASTIC COMPOSITION

No Drawing. Application filed April 7, 1930. Serial No. 442,475.

The present invention relates to liners and sealing compounds for glass containers and other receptacles, and has for its primary object to provide such a liner or compound which will effectively seal the containers to prevent the seepage of oil or other contents.

Oils in general, and especially mineral oils such as Nujol, are very difficult to seal properly since they have a pronounced tendency to seep or crawl past the ordinary liner or other sealing means, no matter how tightly the cap is placed on the container nor how perfect the finish of the container may be. This defect in prior devices, where the packaging of oil is concerned, is practically eliminated by the compound to be described herein, and without unduly increasing the cost of manufacture, and without in any way detracting from the quality of the seal as to appearance, odor, taste, resistance to chemicals, etc.

In preparing the compound either for use as a coating on liners or as a sealing compound to be placed in a sealing groove in the cap or container, one or more binders or adhesives are employed together with a hardener or other ingredient for rendering the binder insoluble and for removing the sticky or tacky characteristics thereof, a solvent, a plasticizer, and preferably a filler or a coloring filler. Where the compound is to be used as a coating a thinner, preferably water, is also employed.

A typical composition producing a coating for liners, having the qualities mentioned above, is as follows:

| | Parts |
|---|---|
| High grade glue | 75 |
| Casein | 175 |
| Talc | 75 |
| Titanium oxide | 75 |
| Diethylene glycol | 400 |
| Paraformaldehyde | 10 |
| Water | 900 |
| Aqua ammonia (28% $NH_3$) | 18 |

The binder employed may be either glue or casein or a combination of both of them as tabulated above. In preparing the compound the glue and casein are first soaked in a portion of the water and then heated to a temperature not exceeding 160° F. until both are in solution. During this heating process, and especially where all or a portion of the adhesive used is casein, ammonia is added to the mixture for the purpose of facilitating its solution. A portion of the plasticizing agent, diethylene glycol, may also be added during this period.

Simultaneously with the preparation of the above solution, the talc in finely ground form, titanium oxide, and paraformaldehyde may be mixed together with the remainder of the diethylene glycol. This mixture may then be added to the casein-glue solution after the casein and glue have completely dissolved and after the solution has been allowed to cool to about 120° F.

If the compound is to be used as a coating for liners, it is then thinned by the addition of the remainder of the water, and applied to the sheets of paper, pulp, foil, or the like, by dipping, spreading or in any other preferred manner. The coated sheets are then dried with a gentle heat at a temperature which gradually increases from 150° to 160° F. By this heating of the coated sheets the excess water in the film is evaporated and the decomposition of the paraformaldehyde is accelerated, thereby liberating the formaldehyde which then combines with the glue and casein to render them insoluble.

The coating as above prepared and applied to sheet material is practically free from odor; it is white, flexible, non-tacky, water repellant, and oil resisting, and provides an excellent liner for bottle caps. Because of its high resistance to oils, the improved liners are particularly useful in the packaging of that product. Moreover, the compound may also be used as a sealing medium for grooved caps by merely omitting the thinner and pouring the material directly in the groove of the cap.

While a specific compound has been described herein and the specific proportions of the ingredients set forth, it is to be understood that both the ingredients and their proportions may be varied considerably. As hereinbefore mentioned, either glue or casein may be employed as the binder instead of both of them together. Also, the fillers and pigments (talc and titanium oxide) may be omitted or replaced by other similar ingredients, although their presence adds to the appearance of the finished product. Furthermore, the diethylene glycol may be replaced by glycerine or other softening agent, and the paraformaldehyde may be replaced by bichromates, tannates, iron salts, alums or other substances capable of hardening the binder employed. Moreover, it is to be noted that the sole purpose of baking the coated sheets is to hasten the liberation of the formaldehyde and thus expedite the hardening of the binder; therefore, inasmuch as the formaldehyde will be liberated at room temperature in the presence of aqueous material it will be obvious that the step of baking the coated sheets may be omitted, if desired.

In accordance with the patent statutes I have described what I now believe to be the preferred form of the invention, but it is intended that all such modifications as to ingredients and proportions thereof as heretofore noted are intended to be included within the scope of the appended claims.

Having fully described the invention, what I claim is:

1. A sealing composition comprising approximately

| | Parts |
|---|---|
| High grade glue | 75 |
| Casein | 175 |
| Talc | 75 |
| Titanium oxide | 75 |
| Diethylene glycol | 400 |
| Paraformaldehyde | 10 |
| Water | 900 |
| Aqua ammonia (28% $NH_3$) | 18 |

2. A composition for coating bottle cap liners including glue, casein, water, and diethylene glycol, with the diethylene glycol present in nearly double the quantity of the glue and casein combined, a filler, with the filler present in a quantity nearly equal to the casein, a small quantity of ammonia, and sufficient paraformaldehyde to harden the glue and casein.

DANIEL M. GRAY.